United States Patent [19]

Eckelt et al.

[11] Patent Number: 4,513,647
[45] Date of Patent: Apr. 30, 1985

[54] PORTABLE PNEUMATIC WIRE CUTTER

[75] Inventors: Peter Eckelt, New Cumberland; James A. Taylor, Jr., Camp Hill, both of Pa.

[73] Assignee: E. I. Du Pont de Nemours and Company, Wilmington, Del.

[21] Appl. No.: 557,276

[22] Filed: Dec. 2, 1983

Related U.S. Application Data

[63] Continuation-in-part of Ser. No. 273,631, Jun. 15, 1981, abandoned.

[51] Int. Cl.³ .............................................. B26D 5/26
[52] U.S. Cl. ........................................ 83/203; 83/232; 83/241; 83/261
[58] Field of Search ................ 83/203, 205, 232, 241, 83/243, 247, 261

[56] References Cited

U.S. PATENT DOCUMENTS

| | | | |
|---|---|---|---|
| 390,601 | 10/1888 | Holtzman | 83/694 |
| 2,388,332 | 11/1945 | Krueger | 83/232 |
| 2,389,531 | 11/1945 | Neale | 83/639 |
| 2,612,951 | 10/1952 | Palmleaf | 83/639 |
| 3,283,631 | 11/1966 | Strom | 83/247 |
| 3,755,657 | 5/1973 | Schmidt et al. | 83/209 |
| 4,046,045 | 9/1977 | Stevens | 83/620 |
| 4,051,749 | 10/1977 | Bell et al. | 81/9.51 |
| 4,130,040 | 12/1978 | Donnelly, Sr. et al. | 83/389 |
| 4,192,207 | 3/1980 | Bickford et al. | 83/241 |
| 4,228,709 | 10/1980 | Guzay, Jr. et al. | 83/620 |
| 4,257,295 | 3/1981 | Patel | 83/374 |
| 4,306,477 | 12/1981 | Travis | 83/205 |

Primary Examiner—James M. Meister

[57] ABSTRACT

A two cycle cutter assembly for severing the end of a multiconnector flexible cable. The assembly employs an air cylinder to supply a down stroke to a guillotine carbide upper blade as a prescribed length of cable is presented between the upper blade and a fixed lower blade.

7 Claims, 9 Drawing Figures

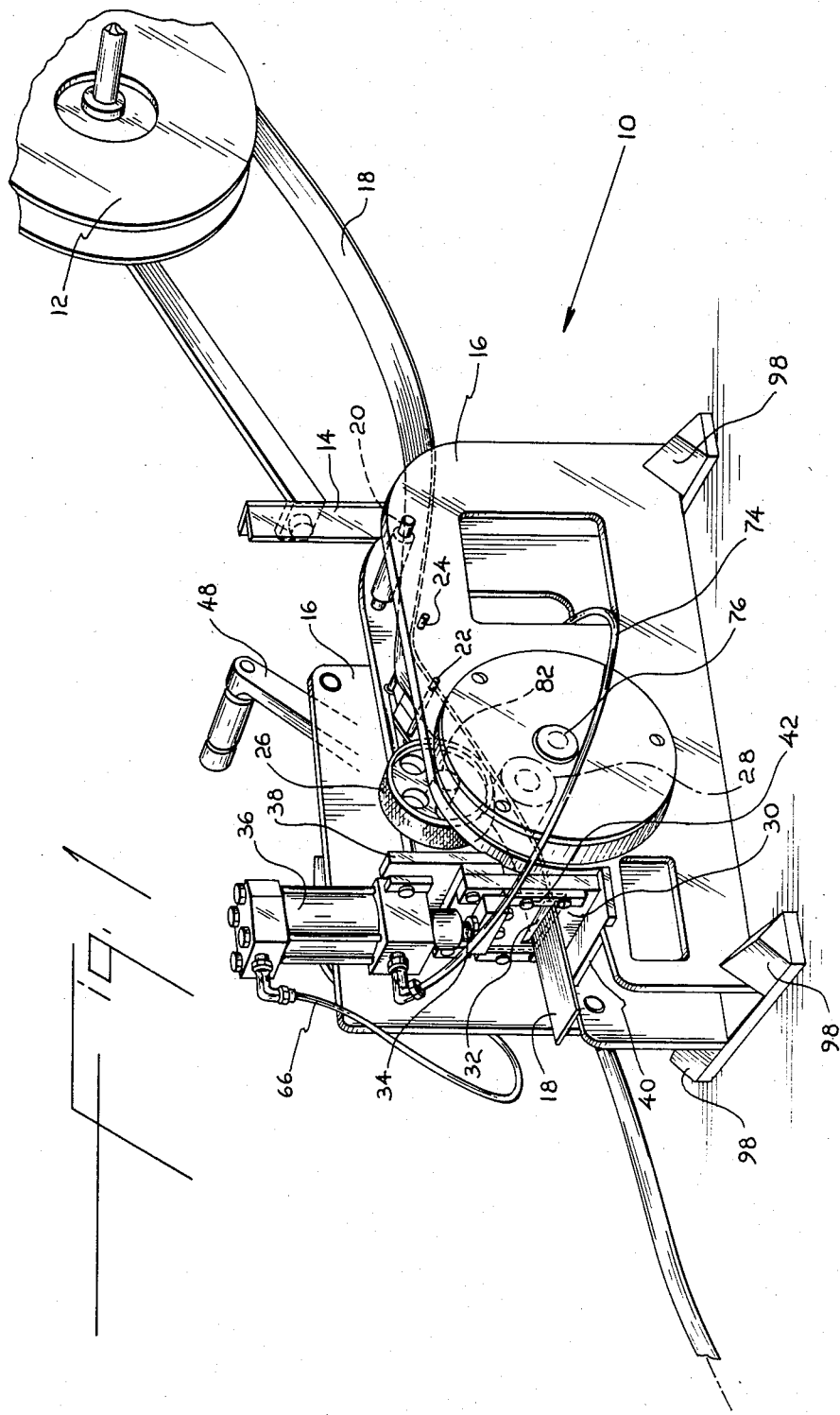

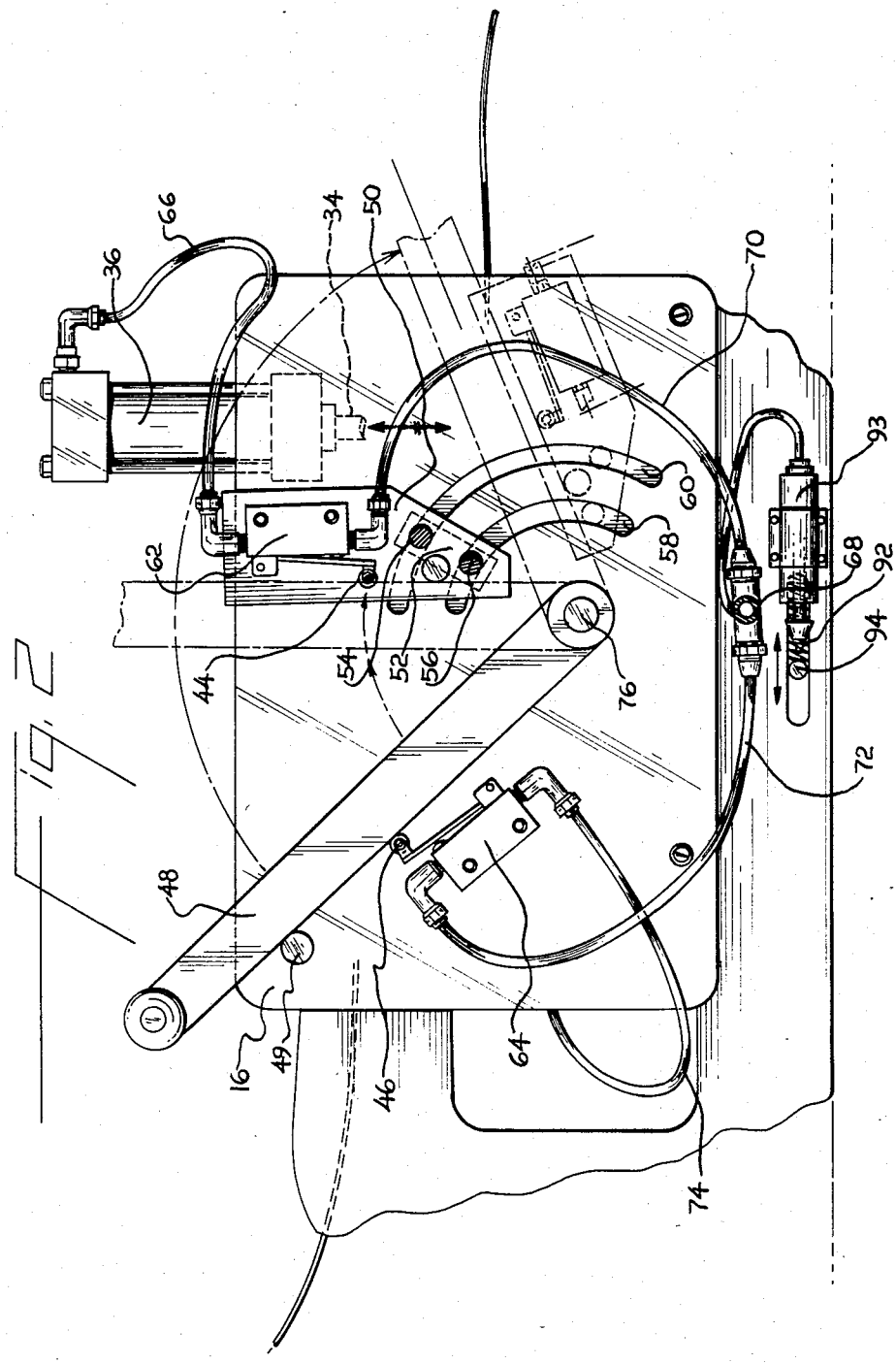

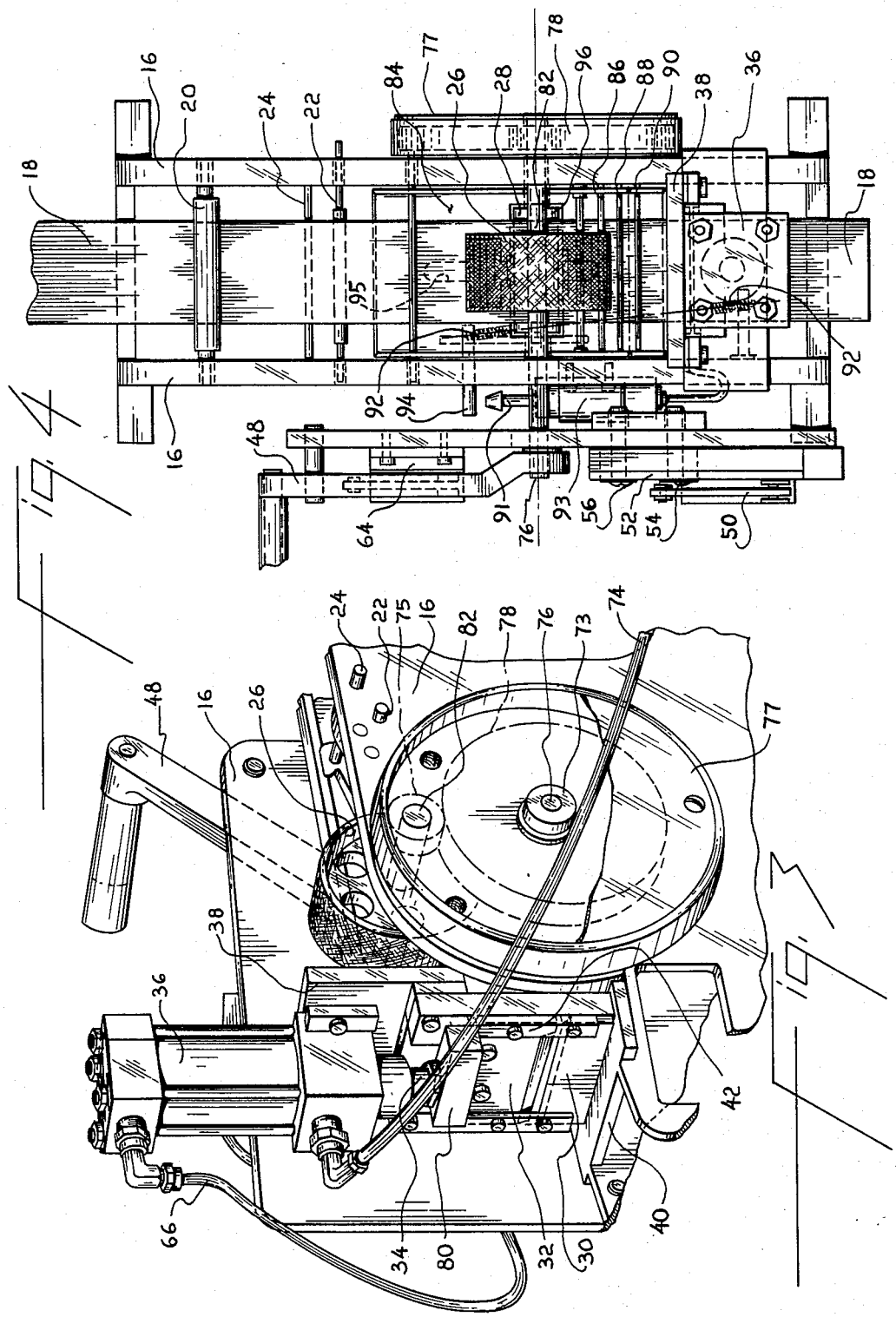

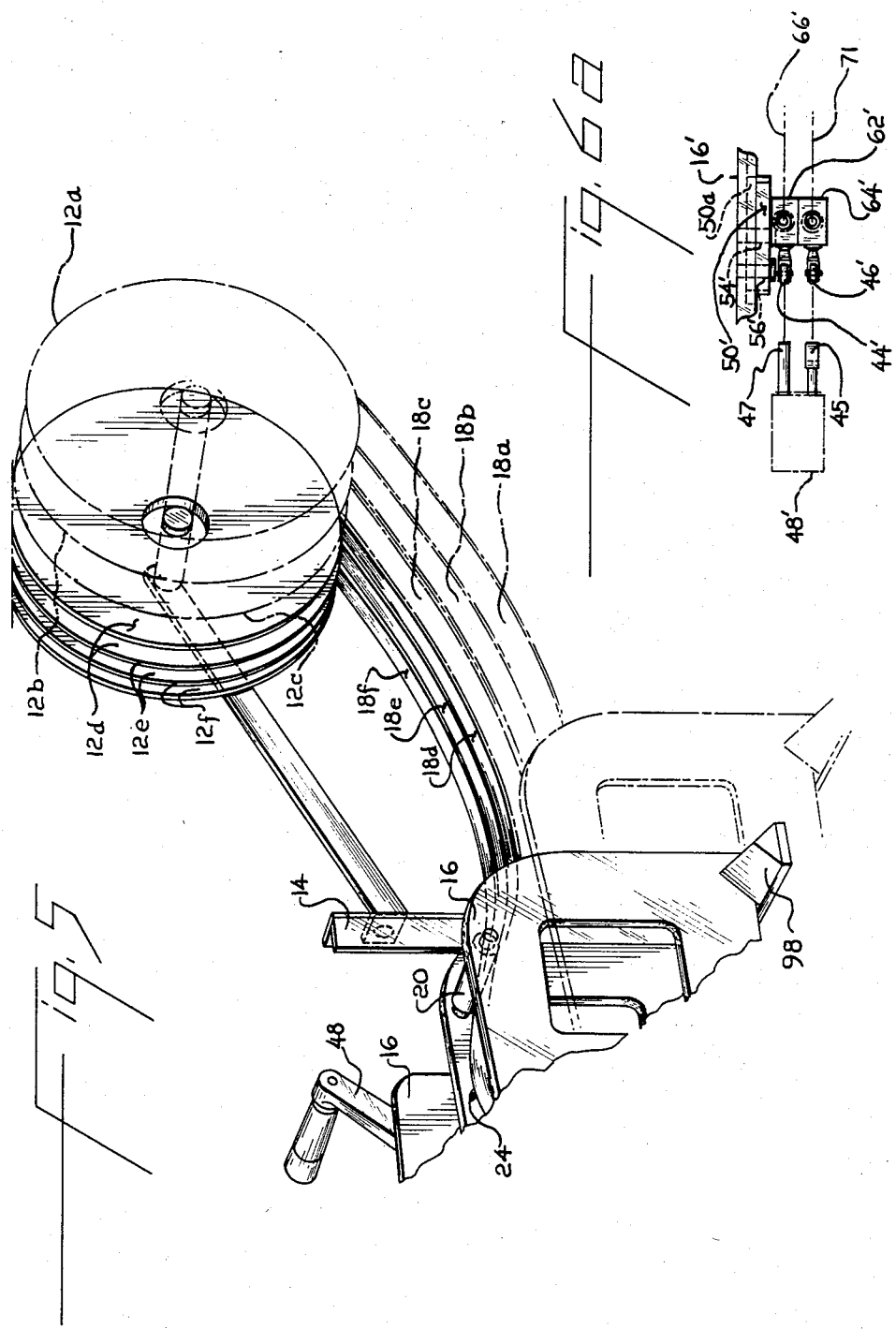

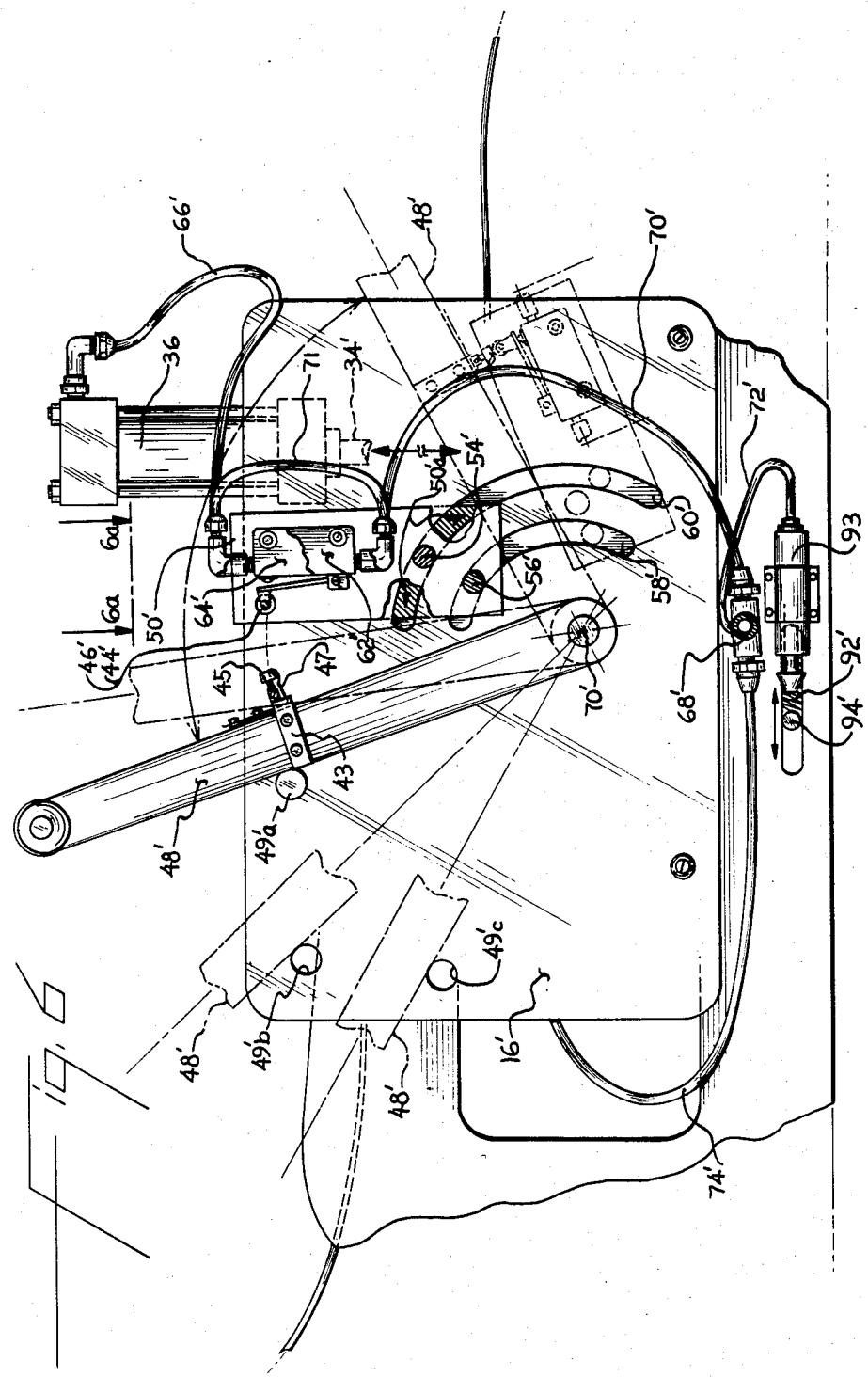

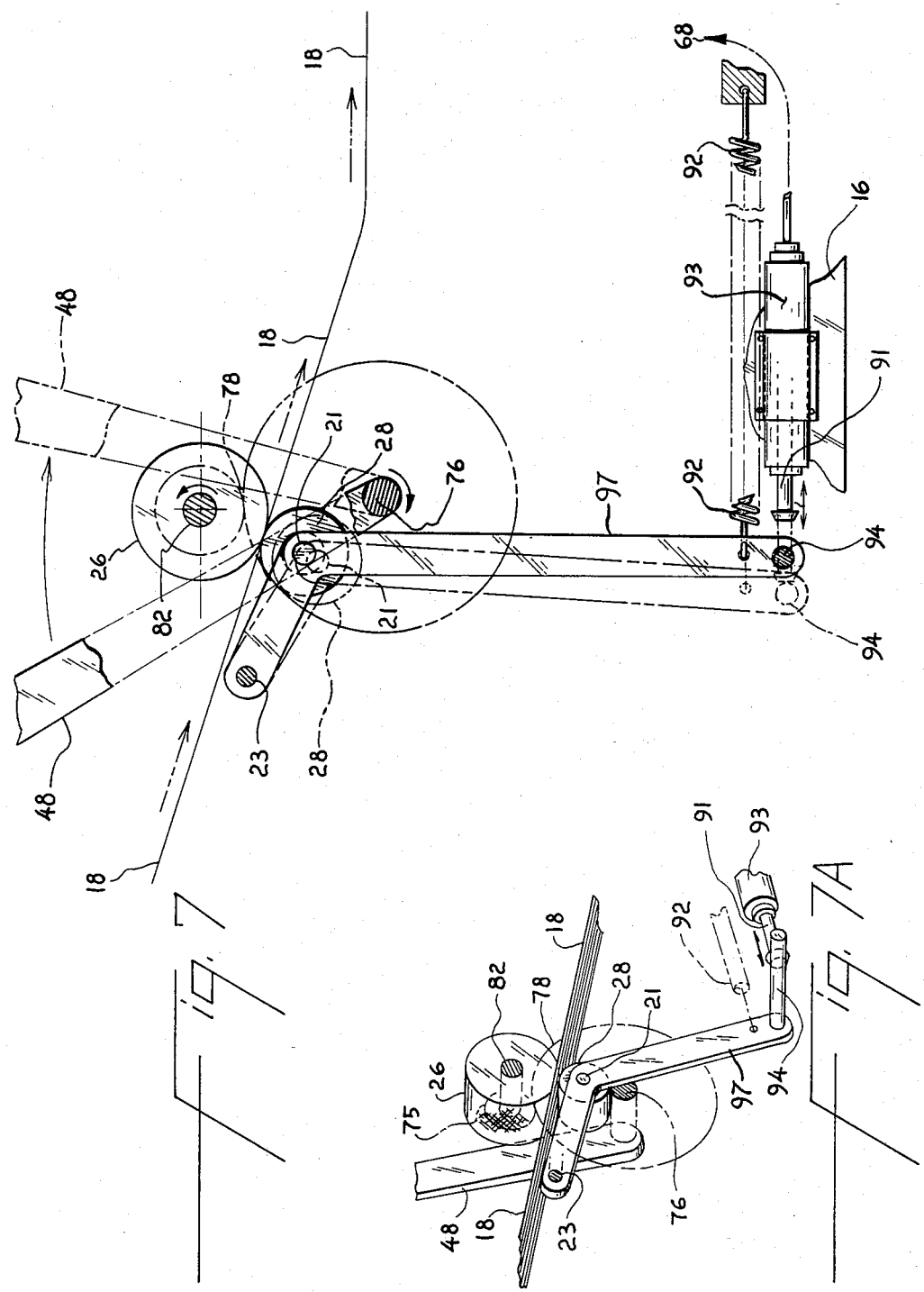

PORTABLE PNEUMATIC WIRE CUTTER

PRIOR APPLICATIONS

This application is a continuation-in-part of application Ser. No. 273,631, filed June 15, 1981, now abandoned.

BACKGROUND

1. Field of the Invention

This invention relates to an article of manufacture for cutting insulated wire. More specifically, it refers to a portable high speed pneumatically actuated insulated wire cutter.

2. The Prior Art

Prior art such as U.S. Pat. No. 4,130,040 describes cutter assemblies for multiconductor flat flexible cable. The cutter described in this reference is a bench press assembly performing the cutting operation in a series of separate steps rather than in any continuous process. Cutting machines for paper such as U.S. Pat. No. 2,388,332 and for fabric such as U.S. Pat. No. 3,735,657 cannot be employed for continuously and rapidly cutting specified lengths of wire cable. A need exists for a machine that will continuously cut multiconductor flat flexible cable.

SUMMARY OF THE INVENTION

Our invention is a multiple strand wire cutting assembly having optional multiple guiding systems so that several different widths of multiple strand cable can be cut simultaneously at the same length. Our assembly consists of a housing supporting pressure rollers and feed rollers accommodating multiple strand wire from a feed reel. The wire is fed to a pair of guillotine type cutting blades. The upper blade is supported on a frame and is movable with respect to that frame by virtue of a cylinder rod actuated by an air cylinder. A handle on one side of the cutting device provides the stroke for actuating the air cylinder and causing the upper blade to descend and cut the multistrand wire at a predetermined length. Reversal of the handle moves the cylinder rod upward and reverses the process. This device provides a portable assembly for easily and quickly cutting specified lengths of multistrand insulated wire so that the wire can be used in various electrical connectors.

BRIEF DESCRIPTION OF THE DRAWINGS

FIG. 1 is a perspective of the cable cutting machine assembly.

FIG. 2 is a partial view of the left side elevation showing the adjustment plate.

FIG. 3 is a partial perspective view of the right side elevation and a view of two internal gears in phantom.

FIG. 4 is a top plan view of the assembled components.

FIG. 5 shows an embodiment of this invention where multiple feed reels are mounted on the feed frame.

FIG. 6 is a partial view of the left side elevation showing a variant actuating mechanism.

FIG. 6a is a top plan view of the actuating mechanism of FIG. 6.

FIG. 7 is a partial view of the internal parts showing the operation of the pressure roller.

FIG. 7a is an isometric view of the arm operating the pressure roller.

DETAILED DESCRIPTION OF THE INVENTION

The pneumatic wire cutter assembly 10 shown in FIG. 1 contains a feed reel 12 mounted on a reel support 14. Alternately the reel can be mounted separate from the assembly 10. The reel support in turn is mounted on frame 16. Multiple strand wire 18 is fed from the feed reel 12 under a guide roller 20. The wire 18 then feeds over and under respectively the two supporting bars 24 and 22 and between feed roller 26 and pressure roller 28 to the cutting blades, 30 and 32. Handle 48 is geared to roller 26 (FIG. 3) so that movement of handle 48 moves roller 26. The lower blade 30 is permanently mounted on the base plate 40 within support frame 42, and the upper movable blade 32 moves within support frame 42. The blades are preferably made of carbide steel. A predetermined length of wire 18 is moved forward and then stops between the cutting blades 30 and 32. Thereafter, cylinder rod 34, activated by the air cylinder 36 supported on mounting block 38, moves down to force blade 32 into the wire so that a clean cut is made.

The air cylinder 36 and its mounting block 38 are supported through blade support frame 42 on a horizontal mounting plate 40. The support frame 42 is mounted perpendicularly to the horizontally positioned mounting plate 40.

The left side of the assembly shown in FIG. 1 contains the contact roller 44 and contact stop 46 which are actuated by movement of the handle 48.

The amount of cable fed through the assembly 10 is determined by the setting on the adjustment plate 50. The nut plate 52 contains two nuts 54 and 56 for mounting the adjustment plate 50 in a prescribed position in the adjusting slots 58 and 60. The slots are calibrated for various wire lengths. The further the adjustment plate 50 is moved downward the greater the distance the handle 48 will travel before stopping and therefore, the longer will be the length of wire cut. An air switch 62 is mounted on the adjustment plate 50. The air hose 66 connects the air cylinder 34 to the air switch 62. The air source connector 68 provides the air to the air cylinder 36 by way of hose 70 and switch 62. Hose 72 leads to the contact stop air switch assembly 64 and hose 74 leads from that assembly to the air cylinder 36. Air pressure of 70–100 psi is adequate to perform the cutting function of this machine.

A ball bearing break commonly called a one-way clutch 73 (FIG. 3) controls movement of gear 78 which is supported by shaft 76. Gear 78 connects by way of gear 75, supported by shaft 82, to the feed roller 26. The clutch 73 places a drag on feed roller 26 through gears 78 and 75. A cover 77 encloses gears 78 and 75 and clutch 73.

FIG. 3 shows the cutting blades in more detail. Top blade 32 rides within a support frame 42. The shaft 34 is attached to the top blade 32 by way of the alignment block 80. Blade 32 moves up and down in response to actuation of the air cylinder 36. Knife blade 30 remains fixed in the bottom of support 42 which in turn is attached to the base plate 40.

FIGS. 4 and 7 show the release spring 92 which acts in response to movement in the direction of the arrows (FIG. 7) of the pressure release rod 94. Additional tension on spring 92 is caused by movement of pressure release rod 94 to the left (FIG. 7) by actuation of plunger 91 by air cylinder 93. This causes arm 97 to pivot on shaft 23 attached to both sides 16 of housing 10, and moves roller 28 away from roller 26. Shaft 21 supporting roller 28 is free standing and not attached to sides 16. When air pressure is released, movement of pressure release arm 97 to the right by spring 92 reseats the pressure roller 28 in juxtaposition to roller 26 so that the wire 18 may be moved within the assembly by movement of handle 48. FIG. 4 also shows the guide rods 86, 88 and 90 over which the wire 18 feeds into the area between the knife blades 30 and 32. A collar 96 is located below the roller 28. A tray 84 is positioned below the wire 18 as it moves into the assembly. A plate 95 over the wire is also shown.

FIG. 5 shows an alternative embodiment of the invention in which more than one feed reel 12; namely 12a, b, c, d, e and f are mounted on the reel support 14. The cumulative width of these wires cannot exceed the width between the two sides of the frame 16 and the width of the cutting blades 30 and 32. Under normal circumstances no more than wires 18a-f will be cut simultaneously. The cutting blades will simultaneously cut all adjacent wires presented.

An alternate means of actuating the cutting blade 32 is shown in FIGS. 6 and 6a. This actuating means consists of a leaf spring 47 and an up stroke activator screw 45 mounted on the handle 48' by means of mounting plate 43. Movement of the handle 48' in a clockwise direction from the stop 49'a, 49'b or 49'c to the contact roller 44' and contact stop 46' causes both actuation of the downward and upward stroke of the blade 32. Similar to the air switch mechanism shown in FIG. 2, the air switch 62' is mounted on the adjustment plate 50'. The air hose 66' connects the air cylinder 34 to the air switch 62'. In contrast to the air stop switch of FIG. 2, the air stop switch 64' is mounted adjacent to the air switch 62'. The air hose 71 feeds air to switch 64'.

Pressure of the leaf spring 47 on the contact roller 44' forces air into the cylinder 36' which moves the blade 32 downward in the first cycle. The pressure of the screw 45 on the roller 46' brings air out of the cylinder 36' and moves the blade 32 upwards in the second cycle. At the same time air moves from the reservoir 68' through hose 72' to the air cylinder 93 which forces a plunger 91' into the pressure release roller 94'. Movement of pressure release rod 94' to the left releases roller 28 from its normal position adjacent roller 26 so that the wire 18 cannot be moved within the assembly by handle 48'.

As with the actuating assembly of FIG. 2, the length of wire fed through the assembly 10 is determined by the setting on the adjustment plates 50' and 50'a. The nuts 54' and 56' hold the plates 50' and 50'a in a prescribed position in the adjusting slots 60' and 58' respectively.

The pneumatic wire cutter assembly 10 normally rests on frame supports 98. The entire unit is sufficiently light to be able to be carried by the normal operator.

Although the FIGS. 1 through 6 show a handle 48 and a manual rotation of that handle it is also possible to attach an electrical apparatus so that actuation of the air switches can be carried out electrically.

The present invention may be subject to many modifications and changes without departing from the spirit or essential characteristics thereof. Thus the above described embodiment should be considered in all respects as illustrative and not restrictive of the scope of the invention.

We claim:

1. A two cycle cutter assembly for severing an end of a multiconductor flexible cable, said assembly comprising
   a frame member having two upright side members capable of supporting at least one feed reel containing multiconductor flexible cable,
   multiple cable guide or support members and a horizontal mounting plate connecting the side members,
   a first cable feed roller supported between the upright side members on a shaft connecting the side members,
   a second cable roller mounted on a pressure release arm pivotable mounted at one end to a shaft connecting the side members, the second cable roller movable towards and away from the first cable feed roller in response to movement of the pressure release arm,
   an air cylinder mounted on the frame above the horizontal mounting plate,
   a blade support mounted on the frame between the air cylinder and the horizontal mounting plate,
   a bottom knife blade fixedly mounted within the blade support and an upper knife blade movable within the blade support in response to actuation of the air cylinder,
   an adjustment plate attached to one of the upright side members controlling maximum movement of the cable during a first cycle of the cutter, the adjustment plate being movable on the same side member within multiple adjustment slots, the position of the adjustment plate in the slots determining the maximum movement of the cable,
   the cable being capable of moving from the reel between the first and second cable rollers and between the upright side members to a position between the knife blades in response to actuation of the first feed roller, and the cable capable of being severed after reaching the point of the maximum movement.

2. A cutter assembly according to claim 1 wherein the feed roller is actuated by moving a handle in a clockwise direction, the handle being mounted on a shaft, geared to the feed roller.

3. A cutter assembly according to claim 1 wherein multiple cable feed reels are mounted on the frame member and multiple cables are severed simultaneously.

4. A cutter assembly according to claim 2 wherein the upper knife blade moves downward in response to the clockwise movement of the handle, the movement causing contact with an air switch.

5. A cutter assembly according to claim 2 wherein the upper knife blade moves downward in response to the clockwise movement of the handle and upwards in response to a counterclockwise movement of the handle, each movement causing contact with a separate air switch.

6. A cutter assembly according to claims 1 or 2 wherein the upper knife blade moves downward and then upwards in response to a clockwise movement of the handle, the movement causing contact with two adjacent air switches.

7. A cutter assembly according to claim 2 wherein the movement of the handle causes contact with two adjacent air switches that activate a stepwise downward and upward movement of the upper knife blade and actuation of a plunger that moves the pressure release arm and the second cable roller away from the first cable feed roller.

* * * * *